(12) United States Patent
Wang et al.

(10) Patent No.: US 8,190,021 B2
(45) Date of Patent: May 29, 2012

(54) SMART PHONE WITH LENS

(75) Inventors: Szu-Wei Wang, Taipei County (TW);
Chih-Ming Chang, Taipei County
(TW); Chin-Hsu Lai, Taipei County
(TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 12/987,838

(22) Filed: Jan. 10, 2011

(65) Prior Publication Data

US 2012/0093494 A1    Apr. 19, 2012

(30) Foreign Application Priority Data

Oct. 15, 2010   (TW) ............................... 99135351 A

(51) Int. Cl.
*G03B 17/02*    (2006.01)

(52) U.S. Cl. ...................... 396/535; 348/374; 455/550.1

(58) Field of Classification Search .............. 396/72, 396/429, 535, 542; 348/374; 455/403, 550.1
See application file for complete search history.

(56) References Cited

U.S. PATENT DOCUMENTS

| | | | |
|---|---|---|---|
| 2002/0015102 A1* | 2/2002 | Itoh et al. | 348/333.06 |
| 2005/0286883 A1* | 12/2005 | Abe et al. | 396/266 |
| 2006/0275025 A1* | 12/2006 | Labaziewicz et al. | 396/72 |
| 2008/0044174 A1* | 2/2008 | Kleverman | 396/529 |
| 2009/0175609 A1* | 7/2009 | Tan | 396/322 |
| 2010/0074610 A1* | 3/2010 | Trevelyan | 396/158 |
| 2011/0002043 A1* | 1/2011 | Seo et al. | 359/666 |
| 2011/0205383 A1* | 8/2011 | Shah | 348/222.1 |
| 2011/0216209 A1* | 9/2011 | Fredlund et al. | 348/211.99 |

* cited by examiner

*Primary Examiner* — Christopher Mahoney
(74) *Attorney, Agent, or Firm* — WPAT, P.C.; Anthony King

(57) ABSTRACT

The present invention discloses a smart phone with a lens comprising a main body, a circuit board, a lens module, a speaker module and a flash module. The main body includes a rear casing having a circuit board mount formed at a lower portion of an inner surface of the rear casing, a lens mount formed at a position adjacent to an upper side of the circuit board mount and attached onto a lateral edge of the rear casing, and a speaker mount formed at an upper edge of the inner surface of the rear casing corresponding to another lateral edge of the rear casing. The circuit board is mounted in the circuit board mount. The lens module is mounted in the lens mount. The speaker module is mounted in the speaker mount. The flash module is mounted between the lens module and the upper edge of the rear casing.

10 Claims, 3 Drawing Sheets

SMART PHONE WITH LENS

BACKGROUND OF THE INVENTION

1. Field of the Invention

The present invention relates to a smart phone with a lens, and more particularly to a mobile phone having a contractible lens and capable of performing logic processing function.

2. Description of the Related Art

As science and technology advance, mobile phones have brought us tremendous convenience, not only providing the functions of transmitting information and making calls anytime, but also providing a convenient way of carrying the phones anywhere. Thus, mobile phones have become a necessary communication tool of our life. As the electronic technology advances, more and more functions of the mobile phone are introduced. A smart phone including an installed processor to provide a high computational capability becomes a mainstream product of the market. In general, the smart phone is equipped with a lens for capturing images or taking pictures.

However, present existing smart phones usually come with a relatively weak photographic function, and the fidelity and quality of the captured images are not as good as those of the images captured by a general lens. Thus, a design of installing a lens to a smart phone was introduced. Since the components installed in the smart phone will occupy a certain volume and the lens is bigger than a general lens, and therefore it is not easy to integrate the lens into a mobile phone of a light, thin, short and compact design. As a result, the space for installing other components must be reduced. For example, most speaker modules are designed with an elliptical shape to fit a smaller space available for its installation, but these speaker modules have a lower sound quality. Obviously, sacrificing the sound quality and function for the installation of the lens in such design is inappropriate for actual practices. Based on this reason, the inventor of the present invention designed a smart phone with a lens, in hope of overcoming the shortcomings of the prior art and improving the application of the smart phone.

SUMMARY OF THE INVENTION

In view of the aforementioned shortcomings, it is a primary objective of the present invention to provide a smart phone with a lens to overcome the shortcomings of the prior art.

To achieve the foregoing objectives, the technical means adopted in the present invention is to provide a smart phone with a lens, comprising:

a main body including a front casing and a rear casing engaged with each other to form a whole casing and define a containing space; a lens module installed in the containing space and electrically coupled to circuit board, wherein a first space is defined by the lens module and an upper edge of the whole casing, and a second space is defined by the lens module and a lower edge of the whole casing, and the first space is smaller than the second space; a circuit board installed in the second space; a speaker module installed in the first space; and a flash module installed in the first space.

Preferably, the lens module includes a zoom lens.

Preferably, a lens opening is formed and penetrated through the rear casing of the main body, and a contractible lens of the lens module is precisely aligned with the lens opening.

Preferably, the flash module is installed on a side of the speaker module.

Preferably, a display screen slot is concavely formed on an outer side of the front casing.

Preferably, the smart phone with a lens further comprises a touch panel module correspondingly installed and sealed into the display screen slot of the front casing, and a circuit of the touch panel module is passed through the front casing and entered into the containing space and electrically coupled to circuit board.

To achieve the foregoing objective, the present invention further provides a smart phone with a lens, comprising:

a main body including a front casing and a rear casing engaged with each other to form a whole casing and define a containing space in the whole casing, a circuit board mount formed at a lower portion of an inner surface of the rear casing, a lens mount formed at a position adjacent to an upper side of the circuit board mount and adjacently attached onto a lateral edge of the rear casing, and an interval being maintained between the lens mount and an upper edge of the inner surface of the rear casing, and a speaker mount formed at the upper edge of the inner surface of the rear casing and corresponding to another lateral edge of the rear casing; a circuit board correspondingly mounted in the circuit board mount of the rear casing; a lens module correspondingly mounted in the lens mount of the rear casing, and electrically coupled to the circuit board; a speaker module correspondingly mounted in the speaker mount, and electrically coupled to the circuit board, and the speaker module being substantially in a circular shape; and a flash module correspondingly installed between the lens module and the upper edge of the rear casing.

Preferably, the rear casing of the main body has a lens opening penetrated through the middle of the lens mount, and the lens module is a zoom lens module having a contractible lens precisely aligned with the lens opening.

Preferably, the interval maintained between the lens mount and the upper edge of the inner surface of the rear casing precisely corresponds to the width of the flash module.

Preferably, a display screen slot is concavely formed on an outer surface of the front casing, and the smart phone with a lens further comprises a touch panel module correspondingly installed and sealed in the display screen slot of the front casing, and a circuit of the touch panel module is passed through the front casing to enter into the containing space and electrically coupled to the circuit board.

Preferably, the speaker mount is substantially in a circular shape.

In the design of the smart phone with a lens of the present invention, components including the circuit board, lens module, speaker module and flash module are installed in the whole casing and mounted in the main body of the phone to maximize the utility of spaces, so that a circular speaker module can be installed to provide the best sound performance of the phone without the drawback of the conventional smart phone that sacrifices the sound quality for the installation of the speaker.

DETAILED DESCRIPTION OF THE PREFERRED EMBODIMENTS

Figure 1:
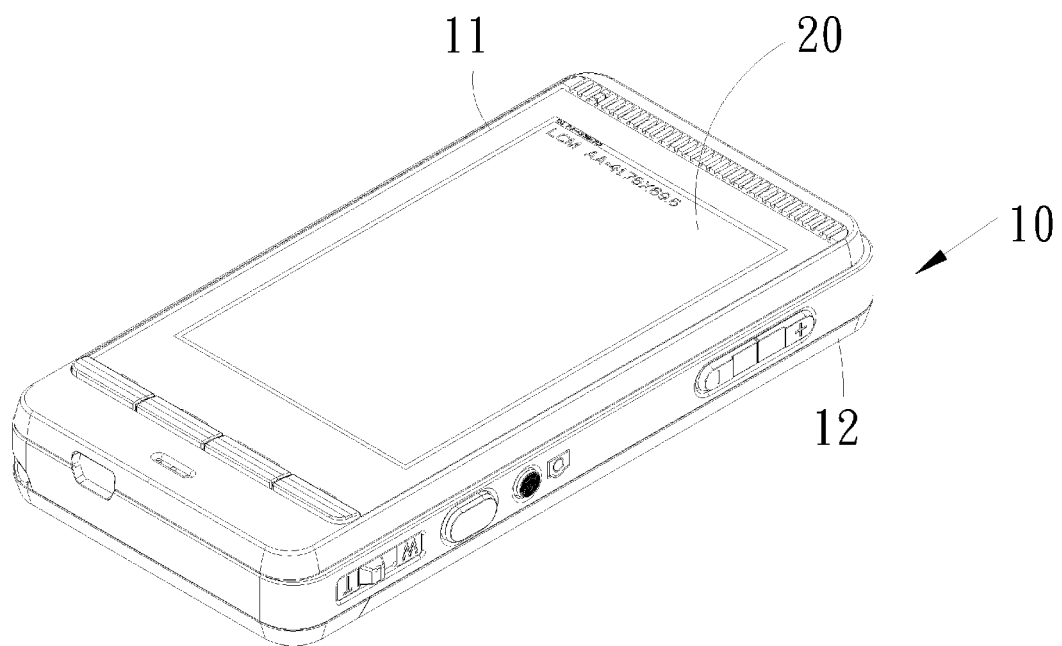
FIG. 1 is a perspective view of a smart phone with a lens of the present invention.

The technical characteristics, contents and advantages of the present invention will be apparent with the detailed description of preferred embodiment together with the illustration of related drawings as follows. It is noteworthy to point out that the drawings are provided for illustrating the invention and supplementing the specification, but not intended for limiting the scope of the present invention, and the size and layout as shown in the drawings may not be in an exact proportion with those used in the actual practice of the present invention.

Figure 2:
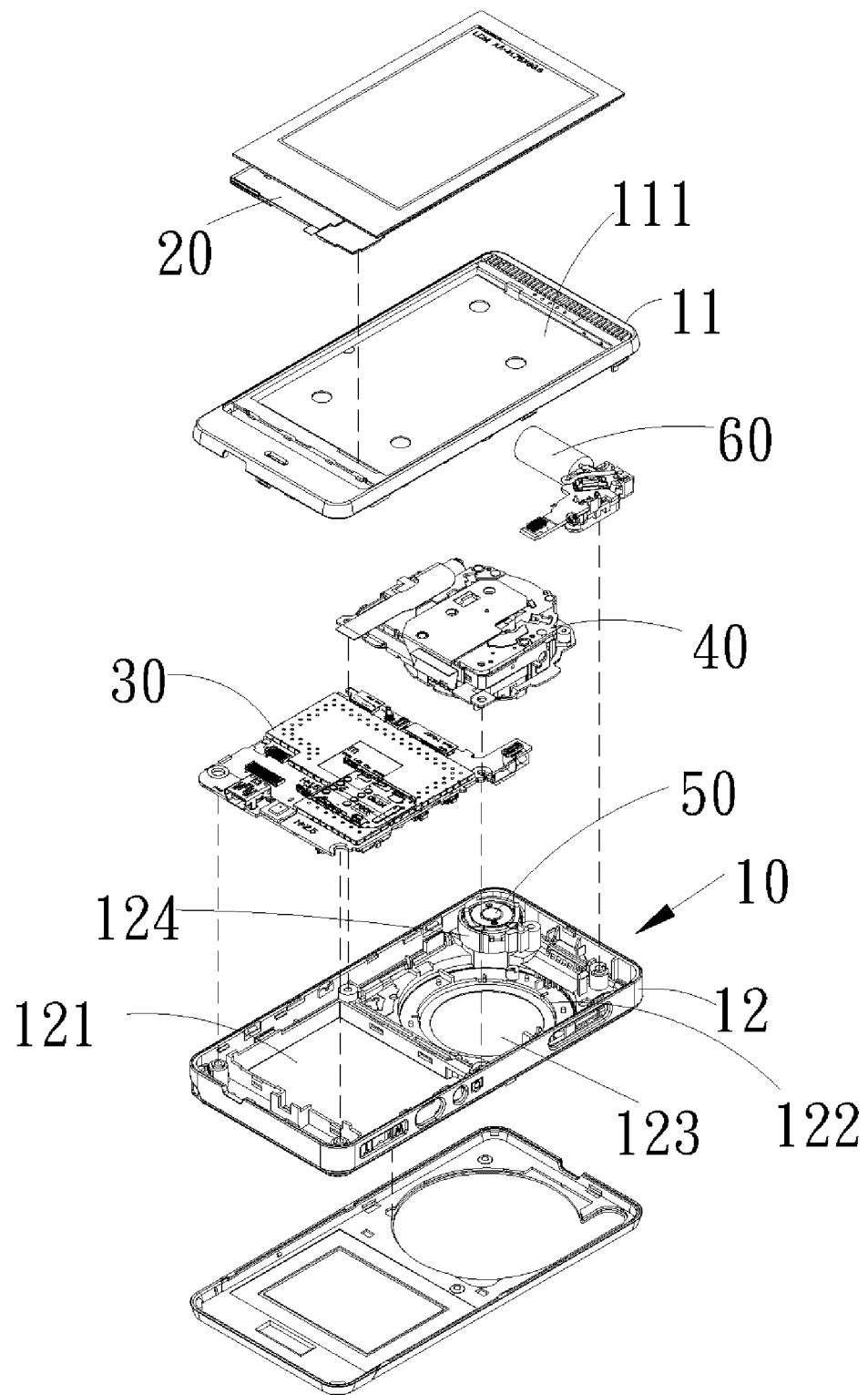
FIG. 2 is an exploded view of a smart phone with a lens of the present invention.
Figure 3:
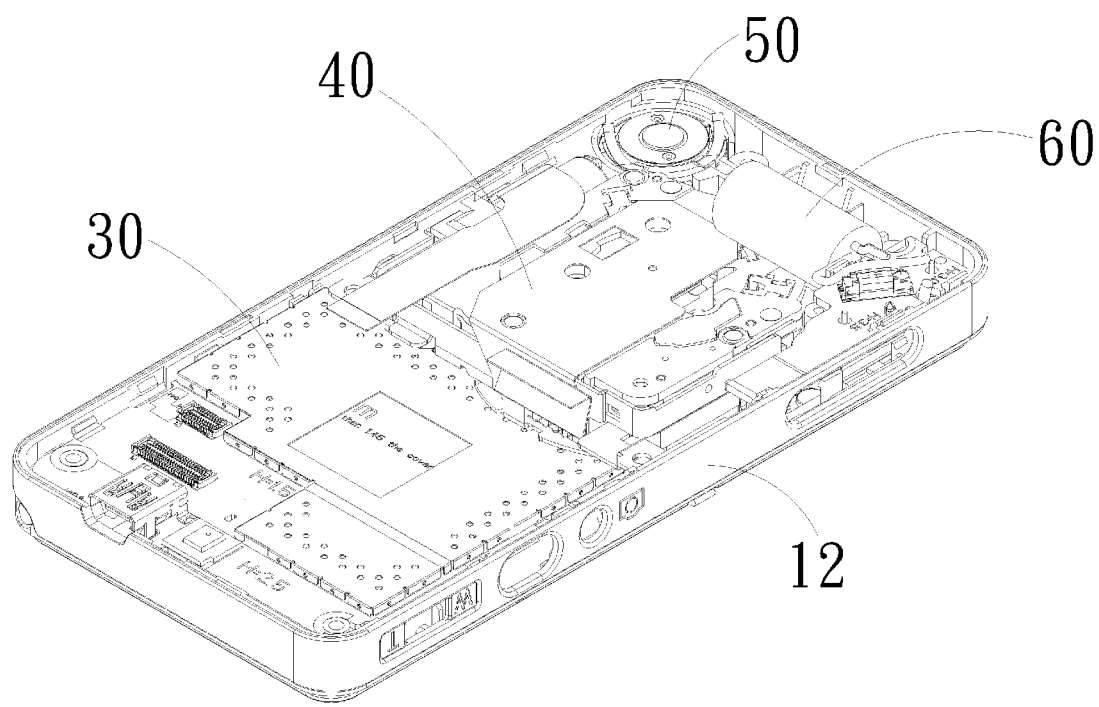
FIG. 3 is a perspective view of a portion of components in a smart phone with a lens of the present invention.

With reference to FIGS. 1 to 3 for a smart phone with a lens in accordance with a preferred embodiment of the present invention, the smart phone comprises a main body 10, a touch panel module 20, a circuit board 30, a lens module 40, a speaker module 50 and a flash module 60.

The main body 10 includes a containing space formed therein, and a front casing 11 and a rear casing 12 engaged with each other to form a whole casing. Wherein, a display screen slot 111 is concavely formed on an outer surface of the front casing 11, and a circuit board mount 121 is formed at a lower portion of an inner surface of the rear casing 12. A lens mount 122 is formed at a position adjacent to an upper side of the circuit board mount 121 and attached next to a lateral edge of the rear casing 12. The rear casing 12 further includes a lens opening 123 is formed and penetrated through the middle of the lens mount 122, and an interval is maintained between the lens mount 122 and an upper edge of the inner surface of the rear casing 12. A speaker mount 124 is formed at the upper edge of the inner surface of the rear casing 12 and corresponding to another lateral edge of the rear casing 12. Wherein, the speaker mount 124 is substantially in a circular shape.

The touch panel module 20 is installed and sealed into the display screen slot 111 of the front casing 11, and a circuit of touch panel module 20 is passed through the front casing 11 and entered into the containing space.

The circuit board 30 is mounted in the circuit board mount 121 of the rear casing 12 and electrically coupled to the touch panel module 20.

The lens module 40 is mounted in the lens mount 122 of the rear casing 12. A first space is defined by the lens module 40 and an upper edge of the whole casing, and a second space is defined by the lens module 40 and a lower edge of the whole casing. Wherein, the first space is smaller than the second space, and the lens module 40 is electrically coupled to the circuit board 30. The lens module 40 is a zoom lens module, and a contractible lens of the lens module 40 is precisely aligned with the lens opening 123 for passing the main body 10 out from the lens opening 123.

The speaker module 50 is mounted in the speaker mount 124 and electrically coupled to the circuit board 30, and the speaker module 50 is designed with a circular shape to provide the best sound effect.

The flash module 60 is installed between the lens module 40 and an upper edge of the rear casing 12, and an interval is maintained between the lens mount 122 and an upper edge of an inner surface of the rear casing 12 and corresponding to the width of the flash module 60.

With the skillful design of the smart phone with a lens in accordance with the present invention, the circuit board 30, lens module 40, speaker module 50 and flash module 60 are mounted into the main body 10 with the best arrangement to maximize the utility of spaces, such that a circular speaker module 50 can be installed to provide the best sound performance of the smart phone, without the drawback of the prior art that sacrifices the sound quality for the installation of the speaker module 50 in a limited space. Consequently, the present invention has advantages and overcomes the shortcomings of the prior art.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. A smart phone with a lens, comprising:
    a main body, including a front casing and a rear casing engaged with each other to form a whole casing and define a containing space, and a display screen slot being concavely formed on an outer surface of the front casing;
    a lens module, installed in the containing space and adjacent to the display screen slot and leaning against a display panel module installed in the display screen slot, and a first space being defined by the lens module and an upper edge of the whole casing, and a second space being defined by the lens module and a lower edge of the whole casing, and the first space being smaller than the second space, a speaker mount, which is substantially in a circular shape, and formed at a upper edge of an inner surface of the rear casing and corresponding to another lateral edge of the rear casing;
    a circuit board, installed in the second space and electrically coupled to the lens module;
    a speaker module, installed in the speaker mount in the first space and the speaker module being circular in shape; and
    a flash module, installed in the first space between the lens module and the upper edge of the rear casing.

2. The smart phone with a lens as recited in claim 1, wherein the lens module includes a zoom lens.

3. The smart phone with a lens as recited in claim 2, wherein the rear casing of the main body has a lens opening penetrated through the rear casing, and a contractible lens of the lens module is precisely aligned with the lens opening.

4. The smart phone with a lens as recited in claim 1, wherein the speaker module is installed at a transversal lateral edge in the first space, and the flash module is disposed adjacent to a side of the speaker module.

5. The smart phone with a lens as recited in claim 1, wherein a display screen slot is concavely formed on an outer surface of the front casing, and wherein the touch panel module correspondingly installed and sealed in the display screen slot of the front casing, and a circuit of the touch panel module is passed through the front casing to enter into the containing space and electrically coupled to the circuit board.

6. A smart phone with a lens, comprising:
    a main body, including a front casing and a rear casing engaged with each other to form a whole casing and define a containing space in the whole casing, a circuit board mount formed at a lower portion of an inner surface of the rear casing, a lens mount formed at a position adjacent to an upper side of the circuit board mount and adjacently attached onto a lateral edge of the rear casing, and an interval being maintained between the lens mount and an upper edge of the inner surface of the rear casing, and a speaker mount formed at the upper edge of the inner surface of the rear casing and corresponding to another lateral edge of the rear casing;
    a circuit board, correspondingly mounted in the circuit board mount of the rear casing;

a lens module, correspondingly mounted in the lens mount of the rear casing and electrically coupled to the circuit board;

a speaker module, correspondingly mounted in the speaker mount and electrically coupled to the circuit board, and the speaker module being substantially in a circular shape; and a flash module, correspondingly installed between the lens module and the upper edge of the rear casing.

7. The smart phone with a lens as recited in claim 6, wherein the rear casing of the main body has a lens opening penetrated through the middle of the lens mount, and the lens module is a zoom lens module having a contractible lens precisely aligned with the lens opening.

8. The smart phone with a lens as recited in claim 7, wherein the interval maintained between the lens mount and the upper edge of the inner surface of the rear casing precisely corresponds to the width of the flash module.

9. The smart phone with a lens as recited in claim 7, wherein a display screen slot is concavely formed on an outer surface of the front casing, and wherein the smart phone with a lens further comprises a touch panel module correspondingly installed and sealed in the display screen slot of the front casing, and a circuit of the touch panel module is passed through the front casing to enter into the containing space and electrically coupled to the circuit board.

10. The smart phone with a lens as recited in claim 7, wherein the speaker mount is substantially in a circular shape.

* * * * *